United States Patent
Nies et al.

(10) Patent No.: US 7,884,835 B2
(45) Date of Patent: **\*Feb. 8, 2011**

(54) TECHNIQUES FOR PROJECTING DATA SETS BETWEEN HIGH-RESOLUTION AND LOW-RESOLUTION OBJECTS

(75) Inventors: Ian A. Nies, San Francisco, CA (US); Michael J. Russo, Berkeley, CA (US); Michaelson Britt, Montreal (CA); Daniel Lévesque, Montreal (CA); Kelcey Simpson, Austin, TX (US); John W. Stetzer, III, San Rafael, CA (US); Lawrence Alan Minton, Orient, OH (US); Rodolfo J. Cazabon, San Francisco, CA (US)

(73) Assignee: Autodesk, Inc., San Rafael, CA (US)

( \* ) Notice: Subject to any disclaimer, the term of this patent is extended or adjusted under 35 U.S.C. 154(b) by 831 days.

This patent is subject to a terminal disclaimer.

(21) Appl. No.: 11/249,899

(22) Filed: Oct. 12, 2005

(65) Prior Publication Data
US 2008/0055330 A1    Mar. 6, 2008

(51) Int. Cl.
G09G 5/00 (2006.01)
(52) U.S. Cl. .................................................. 345/630
(58) Field of Classification Search ................ 345/419, 345/428, 630
See application file for complete search history.

(56) References Cited

U.S. PATENT DOCUMENTS

| | | | |
|---|---|---|---|
| 5,894,308 A | 4/1999 | Isaacs | |
| 6,300,956 B1 | 10/2001 | Apodaca et al. | |
| 6,342,886 B1 * | 1/2002 | Pfister et al. | 345/424 |
| 6,441,816 B1 | 8/2002 | Nguyen et al. | |
| 6,448,968 B1 * | 9/2002 | Pfister et al. | 345/423 |
| 6,867,774 B1 * | 3/2005 | Halmshaw et al. | 345/424 |
| 6,987,878 B2 * | 1/2006 | Lees et al. | 382/154 |
| 7,081,893 B2 | 7/2006 | Cerny | |
| 7,215,335 B2 * | 5/2007 | Matsumoto et al. | 345/419 |
| 7,330,183 B1 * | 2/2008 | Russo et al. | 345/428 |
| 2003/0128210 A1 | 7/2003 | Muffler et al. | |
| 2005/0168461 A1 * | 8/2005 | Acosta et al. | 345/419 |
| 2005/0213809 A1 * | 9/2005 | Lees et al. | 382/154 |

\* cited by examiner

*Primary Examiner*—Xiao M Wu
*Assistant Examiner*—Edward Martello
(74) *Attorney, Agent, or Firm*—Patterson & Sheridan, LLP.

(57) ABSTRACT

A method for projecting a data set from a first object to a second object includes the steps of defining one or more sub-objects, wherein each sub-object represents a portion of the second object, associating the first object with a first sub-object, expanding a projection cage to substantially encompass both the first sub-object and the first object, and transferring the data set from the first object to the first sub-object using the projection cage. The disclosed method advantageously allows the first sub-object to be defined in a way that avoids undesirable cage intersections, thereby enabling the data set from the first object to be transferred without tedious manual manipulations of the projection cage.

30 Claims, 5 Drawing Sheets

TECHNIQUES FOR PROJECTING DATA SETS BETWEEN HIGH-RESOLUTION AND LOW-RESOLUTION OBJECTS

BACKGROUND OF THE INVENTION

1. Field of the Invention

Embodiments of the present invention relate generally to computer graphics and more specifically to techniques for projecting data sets between high-resolution and low-resolution objects.

2. Description of the Related Art

When building a three-dimensional (3D) character or model (also referred to as an "object") for an application such as video games, developers continually contend with the tradeoff between image quality and performance. On one hand, developers want to add as much detail as possible to the 3D character or model to make it appear as life-like as possible. On the other hand, adding detail by increasing the number of polygons (e.g., triangles) making up the 3D character or model and/or applying high resolution bitmaps to the 3D character or model increases the amount of data used to represent the 3D character or model. With more data, more computation time is generally required to process the 3D character or model, which may negatively impact an application like a video game where "real time" graphics and interactivity enhance the overall user experience.

Typically, techniques such as "normal mapping" and "bump mapping" are used to address the tension between image quality and performance. As is well-known, these techniques entail transferring a data set, such as a set of surface normals, from a high-resolution object to a low-resolution object. With the high-resolution data set, shading detail can be added to the low-resolution object to give it a higher-resolution appearance without increasing the number of polygons making up the low-resolution object.

A projection cage is the traditional mechanism for transferring a data set between a high-resolution object and a low-resolution object. In sum, once the high-resolution object and the low-resolution object are aligned, the projection cage is expanded from the low-resolution object to encompass both the low-resolution object and the high-resolution object. A software engine is configured to then transfer the data set from the high-resolution object to the low-resolution object. After the data set is transferred, a two-dimensional bitmap (i.e., texture map) may be rendered that includes texture information from the low-resolution object as well as the high-resolution data set. This bitmap may then be saved and applied to any similar low-resolution object in a video game or other application whenever a higher-resolution appearance is desired.

One drawback to using a projection cage is that with complex low-resolution geometries, when the projection cage is expanded, a face of the projection cage may intersect a high-resolution object being "mapped" onto the low-resolution object or intersect a face of the low-resolution object. Another problem is that part of the projection cage may encompass a high-resolution object that is not being "mapped" onto the portion of the low-resolution model associated with that part of the projection cage. In other words, part of the projection cage volume may intersect the wrong high-resolution object. These phenomena (also referred to herein as "undesirable cage intersections") compromise the software engine's ability to accurately transfer data sets between high-resolution and low-resolution objects. An example of these problems is set forth in FIG. 1A, which conceptually illustrates the transfer of data sets from a high-resolution ring 120 and a high-resolution ring 122 to a low resolution object 100 consisting of a finger 102 and a finger 104. As shown, the data set from the ring 120 is transferred to finger 102, and the data set from ring 122 is transferred to finger 104. Once ring 120 is aligned with finger 102 and ring 122 is aligned with finger 104, a projection cage 106 is expanded from finger 102 to encompass both finger 102 and ring 120 and from finger 104 to encompass both finger 104 and ring 122. Because there is limited space between finger 102 and finger 104, a portion 108 of projection cage 106 associated with finger 102 intersects finger 104 at a location 116. Further, portion 108 intersects ring 122, which is the high-resolution object being "mapped" onto finger 104, at a location 113. Similarly, a portion 110 of projection cage 106 associated with finger 104 intersects finger 102 at a location 112 and intersects ring 120, which is the high-resolution object being "mapped" onto finger 102, at a location 114. Again, these intersections compromise the ability of the software engine to accurately transfer the data sets from ring 120 and ring 122 to finger 102 and finger 104, respectively.

The current solution to these problems is for the developer to manually adjust or manipulate the projection cage to do away with all undesirable cage intersections. FIG. 1B illustrates the configuration of projection cage 106 after such manual adjustment. As shown, portion 108 no longer intersects the 122 or finger 104, and portion 110 no longer intersects ring 120 or finger 102. Manually adjusting a projection cage in this fashion usually is a tedious and time consuming process. Further, in some instances, the projection cage cannot be adjusted to avoid undesirable cage intersections. For example, if portion 108 of projection cage 106 consisted of only one long polygon, then there would not be enough vertices to manually adjust portion 108 to avoid finger 104 or ring 122.

As the foregoing illustrates, what is needed in the art is a way to transfer a data set using a projection cage that avoids the problems arising from undesirable cage intersections described above.

SUMMARY OF THE INVENTION

One embodiment of the present invention sets forth a method for projecting a data set from a first object to a second object. The method includes the steps of defining one or more sub-objects, wherein each sub-object represents a portion of the second object, associating the first object with a first sub-object, expanding a projection cage to substantially encompass both the first sub-object and the first object, and transferring the data set from the first object to the first sub-object using the projection cage. The method may further include the step of rendering one or more texture maps that include texture information from the first sub-object and the data set from the first object. Also, in some embodiments, where multiple texture maps are rendered, the method may include the step of rendering the texture maps at proportional resolutions.

One advantage of the disclosed method is that it allows a low-resolution object with complex geometry to be divided into two or more sub-objects when transferring data sets from one or more high-resolution objects to the low-resolution object. By properly defining the sub-objects, undesirable cage intersections that compromise the accuracy of data set transfers using a projection cage may be avoided. Thus, the disclosed method enables data sets to be transferred using a projection cage without tedious manual manipulations of the projection cage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
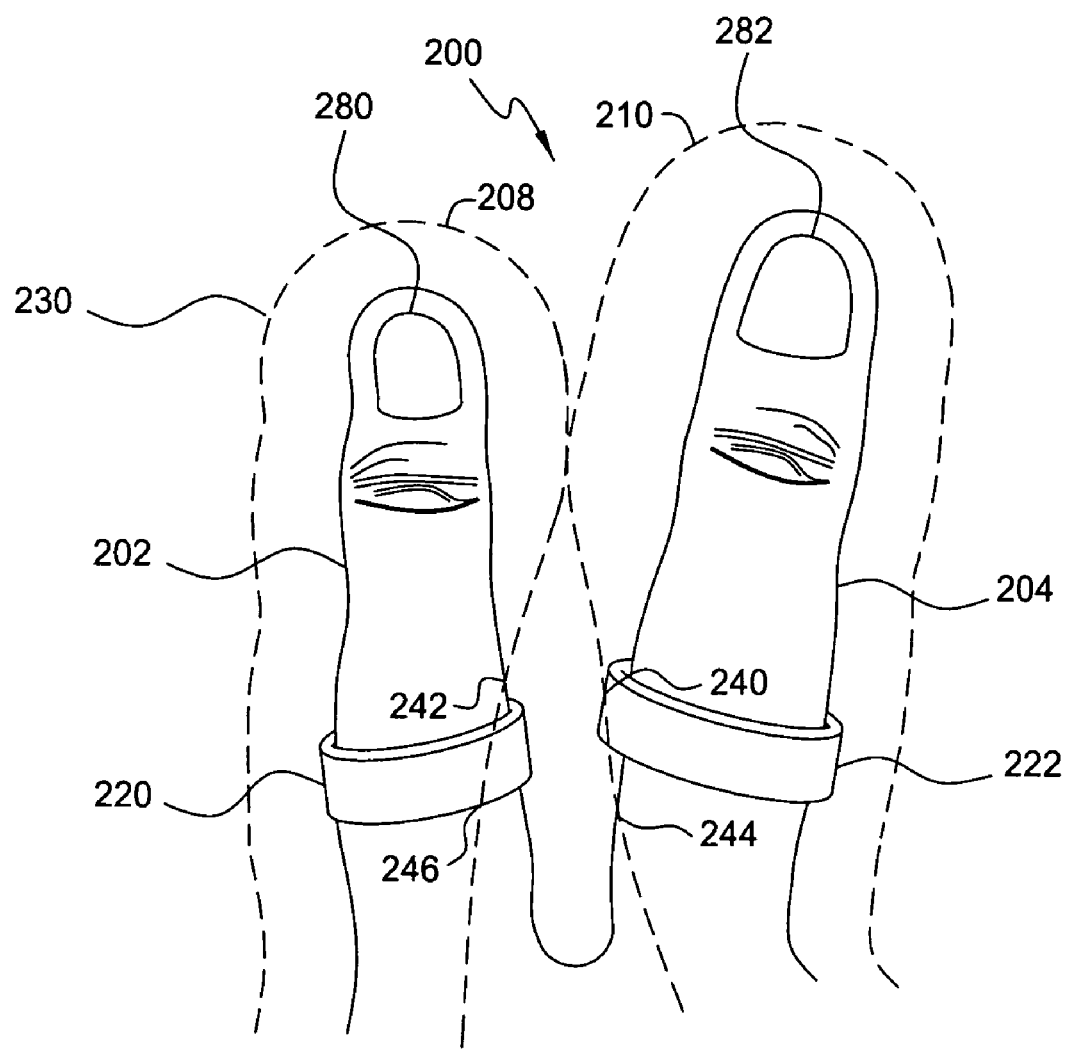
FIG. 2 conceptually illustrates the transfer of data sets from one or more high-resolution objects to a low-resolution object, according to one embodiment of the present invention.

FIG. 2 conceptually illustrates the transfer of a data set from a high-resolution ring 220 and a high resolution ring 222 to a low-resolution object 200, according to one embodiment of the present invention. As depicted, each of ring 220, ring 222 and low-resolution-object 200 is a 3D graphics object. As further depicted, low resolution-object 200 has been divided into two separate sub-objects, a finger 202 and a finger 204. Each of ring 220 and 222 includes a data set that is being transferred to finger 202 and finger 204, respectively, using a projection cage 230. As used herein, "data set" may include any type of data capable of being transferred from one object to another using a projection cage. Examples of data sets include, without limitation, sets of surface normals, ambient occlusion data, height maps, bump map information and other data maps. As set forth in greater detail below, embodiments of the present invention enable sub-object-level transfers of high-resolution data sets, as opposed to the object-level transfers of high-resolution data sets found in the prior art. As such, the inventive technique avoids the drawbacks of prior art techniques previously described herein.

To transfer the data set from ring 220 to finger 202 and the data set from ring 222 to finger 204, first ring 220 is specifically associated with finger 202, and ring 222 is specifically associated with finger 204. Next, ring 220 is aligned with finger 202 to reflect the approximate location of where ring 220 is to appear on finger 202, and ring 222 is aligned with finger 204 to reflect the approximate location of where ring 222 is to appear on finger 204. Once properly aligned, projection cage 230 is defined and expanded to encompass both finger 202 and ring 220 and finger 204 and ring 222. Typically, projection cage 230 is an expansion of low-resolution object 200 and includes a triangle for each triangle of low-resolution object 200. As shown, a portion 208 of projection cage 230 associated with finger 202 intersects finger 204 at a location 244 and intersects ring 222, which is being "mapped" to finger 204, at a location 240. Likewise, a portion 210 of projection cage 230 associated with finger 204 intersects finger 202 at a location 242 and intersects ring 220, which is being "mapped" to finger 202, at a location 246.

After expanding projection cage 230, the data set from ring 220 is transferred to finger 202 and the data set from ring 222 is transferred to finger 204 using any known mapping technique. Importantly, for each individual sub-object, the software engine responsible for performing the data set transfers (e.g., projection engine 407 of FIG. 4) is configured to ignore all geometry in the volume defined by the faces of projection cage 230 related to that sub-object other than the geometry of the sub-object itself and the geometry of the high-resolution object specifically associated with that sub-object from which the data set is being transferred. Thus, the software engine is configured to ignore all geometry other than that of finger 202 (the low-resolution sub-object from which portion 208 expanded) and that of ring 220 (the high-resolution object specifically associated with finger 202) when transferring the data set from ring 220 to finger 202. Likewise, the software engine is configured to ignore all geometry other than that of finger 204 (the low-resolution sub-object from which portion 210 expanded) and that of ring 222 (the high-resolution object specifically associated with finger 204) when transferring the data set from ring 222 to finger 204. Consequently, even though portion 208 of projection cage 230 intersects finger 204 at location 244 and ring 222 at location 240, the transfer of the data set from ring 220 to finger 202 is not adversely affected because the software engine considers only the geometry of finger 202 and ring 220 (the relevant geometry within the volume defined by portion 208 of projection map 230) when transferring the data set. Similarly, even though portion 210 of projection cage 230 intersects finger 202 at location 242 and ring 220 at location 246, the transfer of the data set from ring 222 to finger 204 is not adversely affected because the software engine considers only the geometry of finger 204 and ring 222 (the relevant geometry within the volume defined by portion 210 of projection map 230) when transferring the data set. Thus, unlike in prior art projection cage techniques, the software engine is configured to accurately transfer data sets in the face of undesirable cage intersections.

Once the data sets are transferred, one or more texture maps may be rendered that include texture information from the low-resolution sub-objects, fingers 202 and 204, as well as the high-resolution data sets transferred from the high-resolution objects, rings 220 and 222. In one embodiment, one texture map may be rendered for the low-resolution object from which the various sub-objects are defined. Thus, one texture map may be rendered for low-resolution object 200 that includes texture information from fingers 202 and 204 as well as the data sets from rings 220 and 222. Similar to the texture maps generated using prior art techniques, this texture map may be saved and applied later to a low-resolution object similar in geometry to low-resolution object 200. Once the texture map is applied, the low-resolution object would resemble fingers 202 and 204, and the areas where the data sets reside would appear as high-resolution rings resembling rings 220 and 222. Alternatively, a different texture map may be rendered for each sub-object. Thus, a first texture map may be rendered that includes texture information from finger 202 as well as the data set from ring 220, and a second texture map may be rendered that includes texture information from finger 204 as well as the data set from ring 222. Again, these texture maps may be saved and applied later to low-resolution objects similar in geometry to fingers 202 and 204. Once the texture maps are applied, the low-resolution objects also would resemble fingers 202 and 204, and the areas where the data sets reside also would appear as high-resolution rings resembling rings 220 and 222. Regardless of the number of texture maps rendered, the functionality of the software engine remains the same, enabling accurate transfers of the data sets from rings 220 and 222 to fingers 202 and 204, respectively, while avoiding the problems arising from undesirable cage intersections previously described herein.

When rendering a different texture map for each sub-object, the texture maps may be rendered at full resolution or at proportional resolutions. When rendered at full resolution, the texture map for each sub-object has the same resolution. For example, if full resolution is 256 pixels×256 pixels, then the texture map rendered for each of fingers 202 and 204 would have a resolution of 256 pixels×256 pixels. When rendered at proportional resolutions, however, the texture map for each sub-object has a resolution proportional to the ratio of the surface area of the sub-object to the surface area of the low-resolution object from which the sub-object is defined. For example, suppose full resolution is again 256 pixels×256 pixels, the surface area of finger 202 is 40% of the surface area of low-resolution object 200, and the surface area of finger 204 is 60% of the surface area of low-resolution object 200. If rendered at proportional resolutions, the texture map for finger 202 would have a resolution of approximately 162 pixels×162 pixels, and the texture map for finger 204 would have a resolution of approximately 198 pixels×198 pixels. As the foregoing illustrates, with proportional rendering, each sub-object texture map is effectively "fitted" to a particular sub-object. In other words, a consistent pixel-to-surface-area ratio is maintained among the various sub-object texture maps. Thus, a sub-object texture map rendered proportionally may be applied later to a low-resolution object having geometry similar to that of the particular sub-object without increasing the perceived resolution of the low-resolution object beyond a desired level and reducing overall performance—a potential consequence of using texture maps rendered at full resolution.

In addition, when rendering at proportional resolutions, a proportional multiplier may be applied to increase the resolution of a given texture map. For example, if a texture map rendered proportionally has a resolution of 16 pixels×16 pixels, applying a multiplier of 2.0 would yield a texture map having a resolution of 32 pixels×32 pixels. Thus, proportional multipliers provide an efficient and flexible mechanism for generating texture maps of varying resolution.

In one embodiment, rings 220 and 222 may be instances of the same high-resolution object, or, alternatively, each may be a different high-resolution object (or an instance of a different high-resolution object). In another embodiment, data sets from two or more instances of the same high-resolution object may be transferred to a particular low-resolution sub-object. For example, the data sets from two instances of ring 220 may be transferred to finger 202. In such an embodiment, each instance of ring 220 would first be specifically associated with finger 202. Then, prior to expanding projection cage 230, each instance of ring 220 would be aligned with finger 202 to reflect the approximate location of where that particular instance is to appear on finger 202. In yet another embodiment, data sets from two or more different high-resolution objects may be transferred to a particular low-resolution sub-object. For example, the data sets from both ring 220 and a high-resolution fingernail 280 may be transferred to finger 202, and the data sets from both ring 222 and a high-resolution fingernail 282 may be transferred to finger 204. Again, in such an embodiment, ring 220 and finger nail 280 would be specifically associated with finger 202, and ring 222 and finger nail 282 would be specifically associated with finger 204. Then, prior to expanding projection cage 230, ring 220 and fingernail 280 would be aligned with finger 202, and ring 222 and fingernail 282 would be aligned with finger 204. Persons skilled in the art will recognize that any number or combination of data sets from high-resolution objects may be transferred to a low-resolution sub-object using the techniques described herein. Thus, persons skilled in the art will understand that the scope of the present invention is in no way limited by any of the examples set forth herein.

Figure 3:
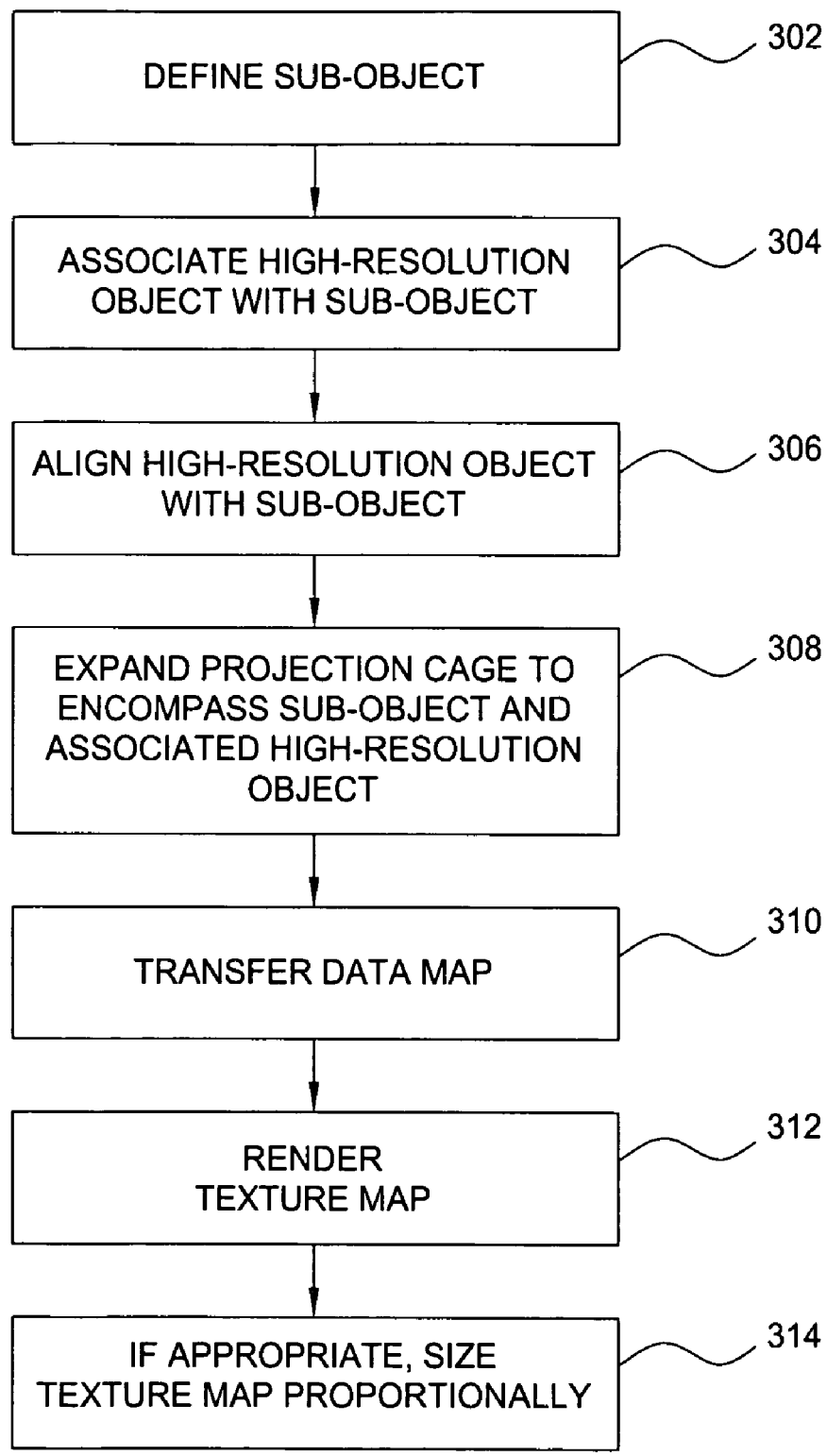
FIG. 3 sets forth a flow diagram of method steps for transferring data sets from one or more high-resolution objects to a low-resolution object, according to one embodiment of the present invention.

FIG. 3 sets forth a flow diagram of method steps for transferring data sets from one or more high-resolution objects to a low-resolution object, according to one embodiment of the present invention. Persons skilled in the art will understand that any system configured to perform the method steps, in any order, is within the scope of the present invention.

Figure 1A:
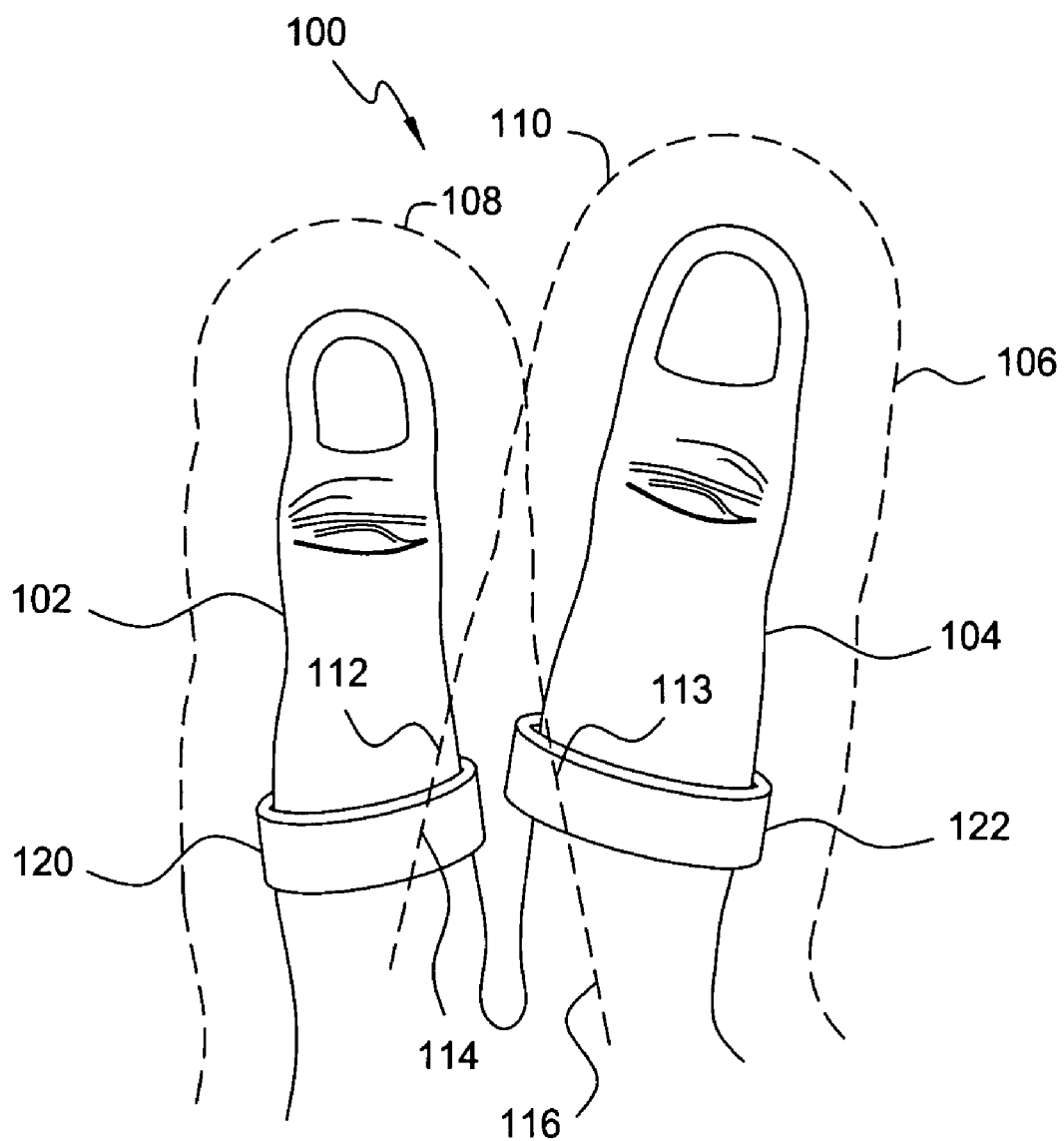
FIGS. 1A and 1B conceptually illustrate the transfer of data sets from two high-resolution objects to a low-resolution object, according to the prior art.
Figure 1B:
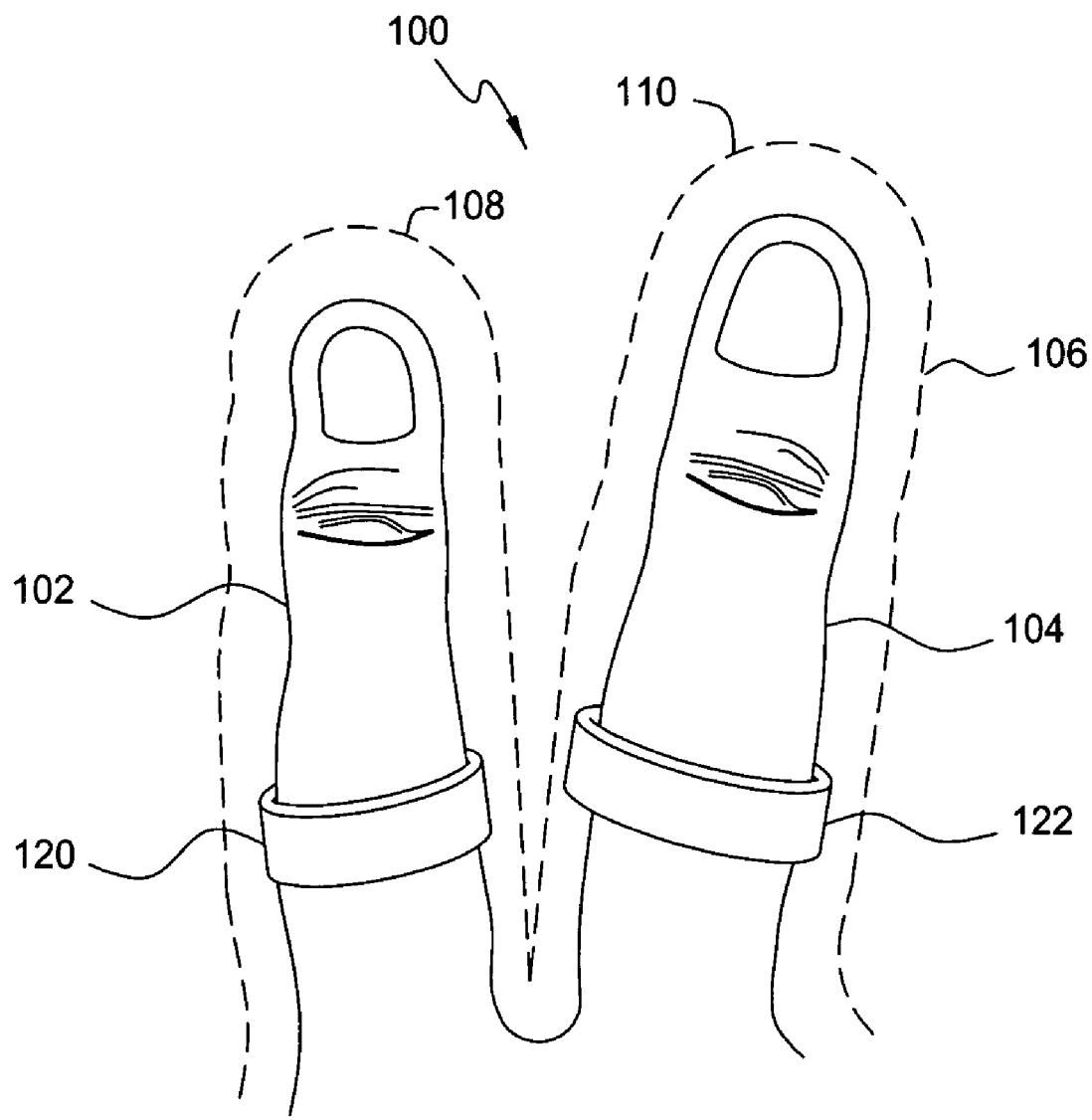

The method of transferring a data set begins in step 302, where a low-resolution object is divided into two or more sub-objects. Generally, sub-objects include portions of the low-resolution object where the geometry is configured in such a way that, when a typical projection cage is expanded from the faces of the low-resolution object to encompass one or more high-resolution objects being "mapped" to the low resolution object, the types of undesirable cage intersections previously described herein result. The sub-objects are defined such that each includes a different surface of the low-resolution object contributing to the undesirable cage intersections. For example, referring back to FIG. 2, since the inside surfaces of fingers 202 and 204 are located closely to one another, expanding a typical projection cage from the faces of low-resolution object 200 to encompass high-resolution rings 220 and 222 would result in various undesirable cage intersections (as shown in FIG. 1A at locations 112, 113, 114 and 116). Thus, low-resolution object 200 is divided into two different sub-objects, fingers 202 and 204, so that the inside surface of each finger is part of a different sub-object.

In step 304, each high-resolution object from which a data set is being transferred is specifically associated with the low-resolution sub-object to which the data set is being transferred. Again, referring back to FIG. 2, since the data set from high-resolution ring 220 is being transferred to finger 202, ring 220 is specifically associated with finger 202. Likewise, since the data set from high-resolution ring 222 is being transferred to finger 204, ring 222 is specifically associated with finger 204. In step 306, each high-resolution object is aligned with its associated sub-object to reflect approximately where the high-resolution object is to appear on the sub-object. Thus, as shown in FIG. 2, ring 220 is aligned with finger 202, and ring 222 is aligned with finger 204.

In step 308, a projection cage is defined for the low-resolution object and expanded to encompass the each sub-object as well as each high-resolution object specifically associated with a given sub-object (i.e., each high-resolution object from which a data set is being transferred). Again, since the projection cage is normally defined based on the low-resolution object and has a corresponding triangle for each triangle of the low-resolution object, the projection cage typically has the same shape as the low-resolution object. Referring back to FIG. 2, projection cage 230 is defined based on low-resolution object 200 is then expanded to encompass finger 202 and ring 220 as well as finger 204 and ring 222.

As previously described herein, for each individual sub-object, the software engine responsible for performing the data set transfers is configured to ignore all geometry in the volume defined by the faces of the projection cage related to that sub-object other than the geometry of the sub-object itself and the geometry of the high-resolution object specifically associated with that sub-object from which the data set is being transferred. In other words, the software engine effectively ignores all other sub-object and high-resolution object geometry within the volume defined by the faces of the projection cage related to specific the sub-object to which the data set is being transferred. By defining each sub-object in step 302 to include a different surface of the low-resolution object contributing to the undesirable cage intersections, the software engine, when transferring a data set to one of the sub-objects, effectively ignores all but one of the surfaces of the low-resolution object contributing to the undesirable cage intersections. Consequently, on a per-sub-object basis, the software engine does not experience or "see" an undesirable cage intersection. In the context of FIG. 2, the software engine is configured to ignore all geometry other than that of finger 202 and ring 220 (the relevant geometry within the volume defined by portion 208 of projection cage 230) when transferring the data set from ring 220 to finger 202 and to ignore all geometry other than that of finger 204 and ring 222 (the relevant geometry within the volume defined by portion 208 of projection cage 230) when transferring the data set from ring 222 to finger 204. Therefore, the data set transfers not adversely influenced by the intersection of portion 208 with the inner surface of finger 204 or ring 222 or by the intersection of portion 210 with the inner the inner surface of finger 202 or ring 220—effectively, these intersections are overruled by the sub-object assignments. In this fashion, the present invention avoids the undesirable cage intersections experienced by projection cage 106 of FIG. 1A. As the foregoing illustrates, the techniques of the present invention may result in more accurate data set transfers relative to prior art project cage techniques (especially in situations where the prior art projection cage cannot be manually manipulated) since the transfers are not compromised by undesirable cage intersections.

In step 310, the data set from each high-resolution object specifically associated with a particular low-resolution sub-object is transferred to the low-resolution sub-object. This step may be accomplished using any known mapping technique. Referring to FIG. 2, the data set from high-resolution ring 220 is transferred to finger 202, and the data set from high-resolution ring 222 is transferred to finger 204. In step 312, one or more texture maps is rendered. As previously described herein, one texture map may be rendered for the low-resolution object that includes texture information from each of the sub-objects defined from the low-resolution object as well as the data sets transferred to each of the sub-objects. Referring to FIG. 2, in this embodiment, one texture map would be rendered for low-resolution object 200 that includes texture information from fingers 202 and 204 as well as the data sets from rings 220 and 222. Alternatively, a separate texture map may be rendered for each sub-object that includes texture information from the sub-object as well as the data sets transferred to that sub-object. Again, referring to FIG. 2, in this embodiment, one texture map would be rendered for finger 202 that includes texture information from finger 202 as well as the data set from ring 220, and a second texture map would be rendered for finger 204 that includes texture information from finger 204 as well as the data set from ring 222. Lastly, in step 314, when a texture map is rendered for each sub-object, the texture maps may be rendered at full resolution or at proportional resolutions, as previously described herein.

One advantage of the disclosed technique is that it allows a low-resolution object with complex geometry to be divided into two or more sub-objects when transferring data sets from one or more high-resolution objects to the low-resolution object. By properly defining the sub-objects, undesirable cage intersections that compromise the accuracy of data set transfers using a projection cage may be avoided. Thus, the disclosed technique enables data sets to be transferred using a projection cage without tedious manual manipulations of the projection cage.

Figure 4:
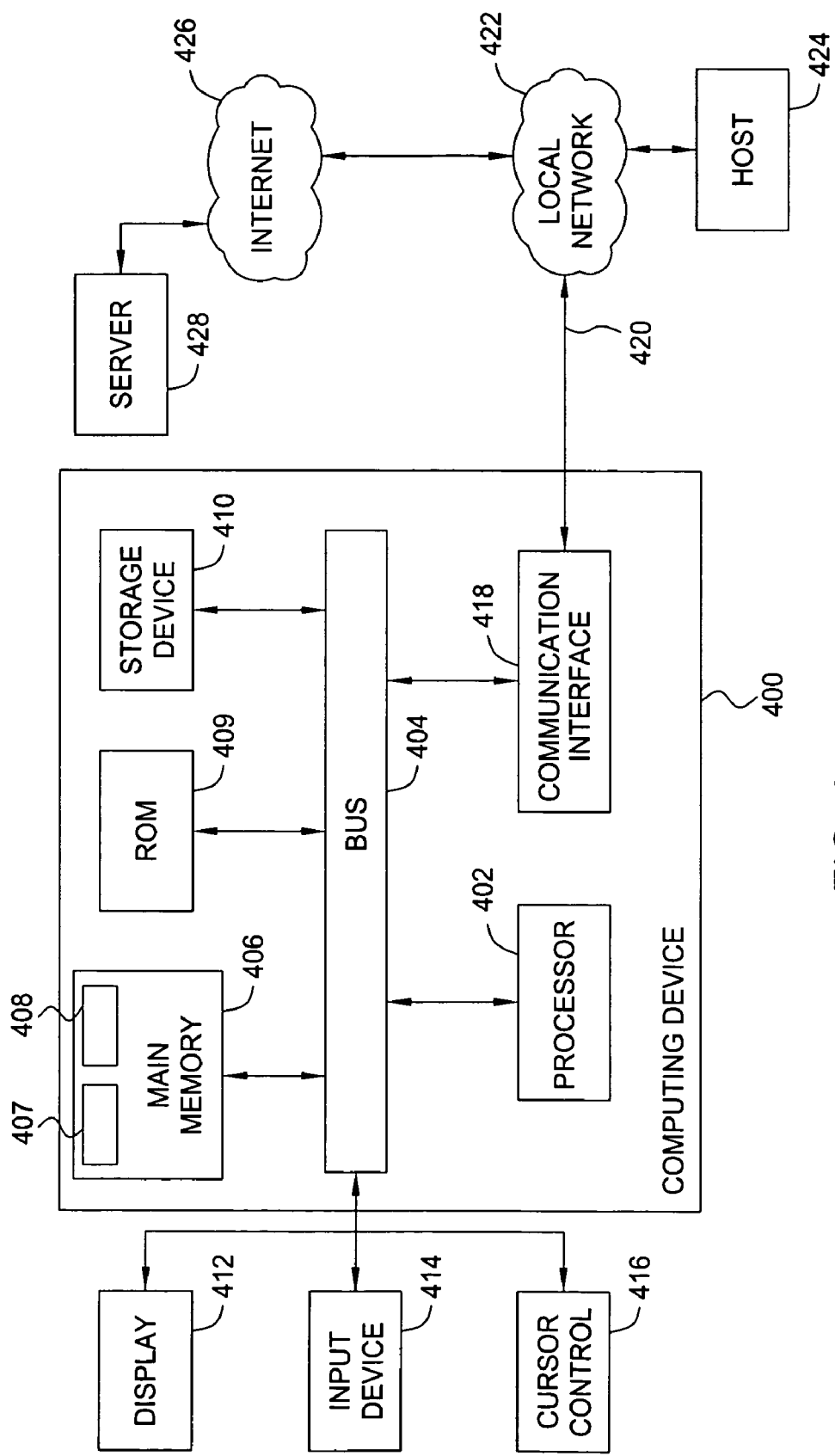
FIG. 4 is a conceptual diagram of a computing device that may be configured to implement one or more aspects of the present invention.

FIG. 4 is a conceptual diagram of a computing device 400 that may be configured to implement one or more aspects of the present invention. Computing device 400 may be any type of computing device such as, for example, a desktop computer, a laptop computer, a server machine, a set-top box, a game system or console, a personal digital assistant or a cellular phone. As shown, computing device 400 includes, without limitation, a bus 404 for communicating information and a processor 402 coupled to bus 404 for processing information.

Computing device 400 also includes a main memory 406, such as a random access memory or other dynamic storage device, a read-only memory 409, and a storage device 410 for storing information and instructions to be executed by processor 402. For example, a projection engine 407 and a rendering engine 408 of a 3D graphics application may reside within main memory 406. Projection engine 407 may be configured, for example, to select various low-resolution and high resolution objects, to define the various sub-objects, to specifically associate one or more high-resolution objects with a particular sub-object, to align the high-resolution objects with the various sub-objects and to define and expand the projection cage, in response to various user inputs, as well as to transfer the data sets from the high-resolution objects to the sub-objects. Rendering engine 408 may be configured to render one or more texture maps once the data sets from the high-resolution objects have been transferred to the sub-objects and, when rendering multiple texture maps, to render those texture maps at both full resolution and proportional resolutions. Processor 402 is configured to execute instructions for implementing the method of FIG. 3, including the relevant functionalities of the projection engine 407 and the rendering engine 408. Processor 402 may be a central processing unit (CPU), a graphics processor, any other type of special-purpose processor or a hardware state machine with special-purpose logic dedicated to implementing only the functionality of the disclosed method.

Computing device 400 may be coupled via bus 404 to a display 412 for displaying information to a user, including one or more graphical user interfaces (GUIs) implemented by the 3D graphics application. An input device 414, including alphanumeric and other keys, is coupled to bus 404 for communicating commands and other information to processor 402. Another type of user input device is a cursor control 416, such as a mouse, trackball or direction keys, for communicating command selections and direction information to processor 402 and for controlling cursor position and movement on display 412. Input device 414 and/or cursor control 416 may be used separately or in conjunction with the one or more GUIs, for example, to select particular low-resolution objects, to define various sub-objects for a particular low-resolution object, to select different high-resolution objects, to create instances of the selected high-resolution objects, to specifically associate one or more high-resolution objects with a particular sub-object, to align the high-resolution objects with the various sub-objects and to define and expand the projection cage.

Computing device 400 also may include a communication interface 418 coupled to bus 404 that provides access to a local network 422 via a network link 420. Local network 422 may, in turn, couple computing device 400 to a host computer 424 or other device on local network 422, or may couple computing device 400 to more remote devices, such as a server 428, through a wide area network, such as Internet 426.

In one embodiment of the present invention, a computer-readable medium stores instructions for causing a computing device to project a data set from a first object to a second object by performing the steps of defining one or more sub-objects, wherein each sub-object represents a portion of the second object, associating the first object with a first sub-object, expanding a projection cage to substantially encompass both the first sub-object and the first object, and transferring the data set from the first object to the first sub-object using the projection cage.

While the foregoing is directed to embodiments of the present invention, other and further embodiments of the invention may be devised without departing from the basic scope thereof. For example, the techniques described herein may just as easily be used to transfer data sets from low-resolution objects to high-resolution sub-objects. The scope of the present invention is therefore determined by the claims that follow.

We claim:

1. A computer-implemented method for projecting a data set from a first graphics object to a second graphics object, wherein the first graphics object and the second graphics object are defined via a graphics application executing on a processor, the method comprising:
    dividing the second graphics object into a first sub-object and a second sub-object, wherein each sub-object is associated with a different portion of the second graphics object;
    associating the first graphics object with the first sub-object;
    expanding a projection cage to substantially encompass both the first sub-object and the first graphics object, wherein the projection cage intersects a portion of a face associated with the second sub-object; and
    transferring the data set from the first graphics object to the first sub-object using the projection cage, wherein a first portion of geometry that is associated with the first sub-object and intersected by the projection cage is transferred with the data set, and a second portion of geometry that is associated with a volume defined by the face associated with the second sub-object and intersected by the projection cage is not transferred with the data set.

2. The method of claim 1, further comprising the step of aligning the first graphics object with the first sub-object.

3. The method of claim 1, wherein the first graphics object comprises a high-resolution 3D model, and the second graphics object comprises a low-resolution 3D model.

4. The method of claim 1, wherein the first graphics object comprises a low-resolution 3D model, and the second graphics object comprises a high-resolution 3D model.

5. The method of claim 1, further comprising the step of rendering a texture map, wherein the texture map includes texture information from the first sub-object and the data set transferred from the first graphics object to the first sub-object.

6. The method of claim 1, further comprising the steps of associating an instance of the first graphics object with the second sub-object, expanding the projection cage to substantially encompass both the second sub-object and the instance of the first graphics object, and transferring a data set from the instance of the first graphics object to the second sub-object using the projection cage.

7. The method of claim 6, further comprising the step of rendering a texture map, wherein the texture map includes texture information from the first sub-object, texture information from the second sub-object, the data set transferred from the first graphics object to the first sub-object, and the data set transferred from the instance of the first graphics object to the second sub-object.

8. The method of claim 6, further comprising the step of rendering a first texture map and a second texture map, wherein the first texture map includes texture information from the first sub-object and the data set transferred from the first graphics object, and the second texture map includes texture information from the second sub-object and the data set transferred from the instance of the first graphics object.

9. The method of claim 8, wherein the first texture map has a resolution proportional to a ratio of a surface area of the first sub-object to a surface area of the second graphics object, and the second texture map has a resolution proportional to a ratio of a surface area of the second sub-object to the surface area of the second graphics object.

10. The method of claim 1, further comprising the steps of associating a third graphics object with the second sub-object, expanding the projection cage to substantially encompass both the second sub-object and the third graphics object, and transferring a data set from the third graphics object to the second sub-object using the projection cage.

11. The method of claim 10, further comprising the step of rendering a texture map, wherein the texture map includes texture information from the first sub-object, texture information from the second sub-object, the data set transferred from the first graphics object to the first sub-object, and the data set transferred from the third graphics object to the second sub-object.

12. The method of claim 10, further comprising the step of rendering a first texture map and a second texture map, wherein the first texture map includes texture information from the first sub-object and the data set transferred from the first graphics object to the first sub-object, and the second texture map includes texture information from the second sub-object and the data set transferred from the third graphics object to the second sub-object.

13. The method of claim 12, wherein the first texture map has a resolution proportional to a ratio of a surface area of the first sub-object to a surface area of the second graphics object, and the second texture map has a resolution proportional to a ratio of a surface area of the second sub-object to the surface area of the second graphics object.

14. The method of claim 1, wherein the data set comprises a set of surface normals.

15. The method of claim 1, further comprising the step of determining that the data set from the first graphics object should not be transferred to a second sub-object of the two or more sub-objects encompassed, at least in part, by the projection cage, wherein the second sub-object is not associated with the first graphics object.

16. A non-transitory computer-readable medium storing instructions for causing a computing device to project a data set from a first graphics object to a second graphics object, by performing the steps of:
    dividing the second graphics object into a first sub-object and a second sub-object, wherein each sub-object is associated with a different portion of the second graphics object;
    associating the first graphics object with the first sub-object;
    expanding a projection cage to substantially encompass both the first sub-object and the first graphics object, wherein the projection cage intersects a portion of a face associated with the second sub-object; and transferring the data set from the first graphics object to the first sub-object using the projection cage, wherein a first portion of geometry that is associated with the first sub-object and intersected by the projection cage is transferred with the data set, and a second portion of geometry that is associated with a volume defined by the face associated with the second sub-object and intersected by the projection cage is not transferred with the data set.

17. The computer-readable medium of claim 16, further comprising the step of aligning the first graphics object with the first sub-object.

18. The computer-readable medium of claim 16, wherein the first graphics object comprises a high-resolution three dimensional (3D) model, and the second graphics object comprises a low-resolution 3D model.

19. The computer-readable medium of claim 16, wherein the first graphics object comprises a low-resolution 3D model, and the second graphics object comprises a high-resolution 3D model.

20. The computer-readable medium of claim 16, further comprising the step of rendering a texture map, wherein the texture map includes texture information from the first sub-object and the data set transferred from the first graphics object to the first sub-object.

21. The computer-readable medium of claim 16, further comprising the steps of associating an instance of the first graphics object with the second sub-object, expanding the projection cage to substantially encompass both the second sub-object and the instance of the first graphics object, and transferring a data set from the instance of the first graphics object to the second sub-object using the projection cage.

22. The computer-readable medium of claim 21, further comprising the step of rendering a texture map, wherein the texture map includes texture information from the first sub-object, texture information from the second sub-object, the data set transferred from the first graphics object to the first sub-object, and the data set transferred from the instance of the first graphics object to the second sub-object.

23. The computer-readable medium of claim 21, further comprising the step of rendering a first texture map and a second texture map, wherein the first texture map includes texture information from the first sub-object and the data set transferred from the first graphics object, and the second texture map includes texture information from the second sub-object and the data set transferred from the instance of the first graphics object.

24. The computer-readable medium of claim 23, wherein the first texture map has a resolution proportional to a ratio of a surface area of the first sub-object to a surface area of the second graphics object, and the second texture map has a resolution proportional to a ratio of a surface area of the second sub-object to the surface area of the second graphics object.

25. The computer-readable medium of claim 16, further comprising the steps of associating a third graphics object with the second sub-object, expanding the projection cage to substantially encompass both the second sub-object and the third graphics object, and transferring a data set from the third graphics object to the second sub-object using the projection cage.

26. The computer-readable medium of claim 25, further comprising the step of rendering a texture map, wherein the texture map includes texture information from the first sub-object, texture information from the second sub-object, the data set transferred from the first graphics object to the first sub-object, and the data set transferred from the third graphics object to the second sub-object.

27. The computer-readable medium of claim 25, further comprising the step of rendering a first texture map and a second texture map, wherein the first texture map includes texture information from the first sub-object and the data set transferred from the first graphics object to the first sub-object, and the second texture map includes texture information from the second sub-object and the data set transferred from the third graphics object to the second sub-object.

28. The computer-readable medium of claim 27, wherein the first texture map has a resolution proportional to a ratio of a surface area of the first sub-object to a surface area of the second graphics object, and the second texture map has a resolution proportional to a ratio of a surface area of the second sub-object to the surface area of the second graphics object.

29. The computer-readable medium of claim 16, wherein the data set comprises a set of surface normals.

30. The computer-readable medium of claim 16, further performing the step of determining that the data set from the first graphics object should not be transferred to a second sub-object of the two or more sub-objects encompassed, at least in part, by the projection cage, wherein the second sub-object is not associated with the first graphics object.

* * * * *